May 8, 1934.   W. H. BEECH   1,958,229
SAFETY METER
Filed March 26, 1931
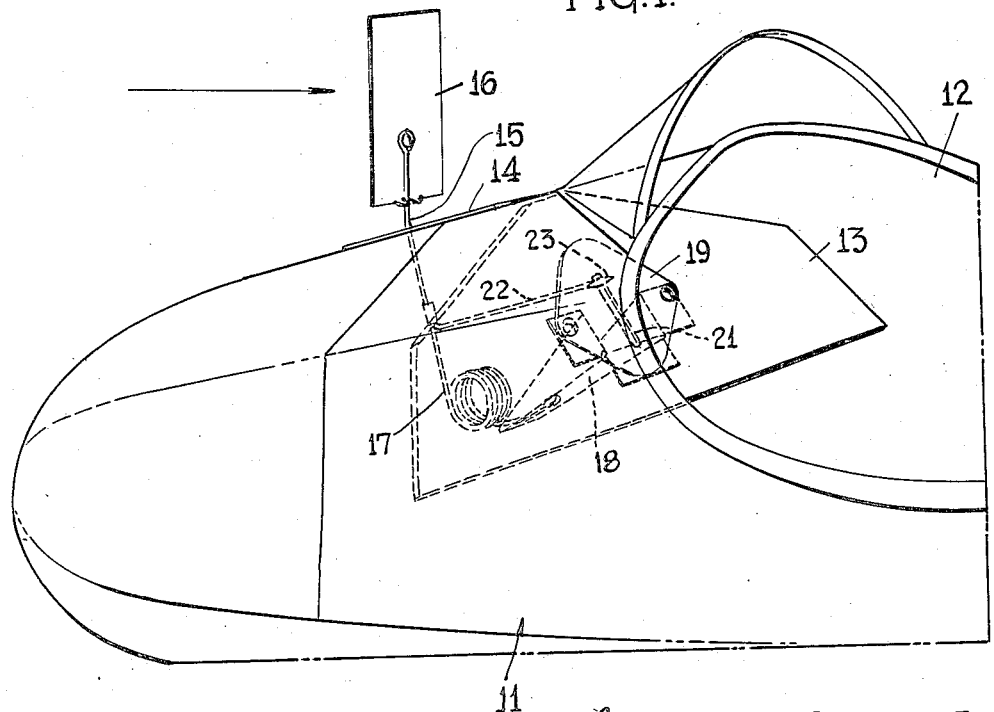
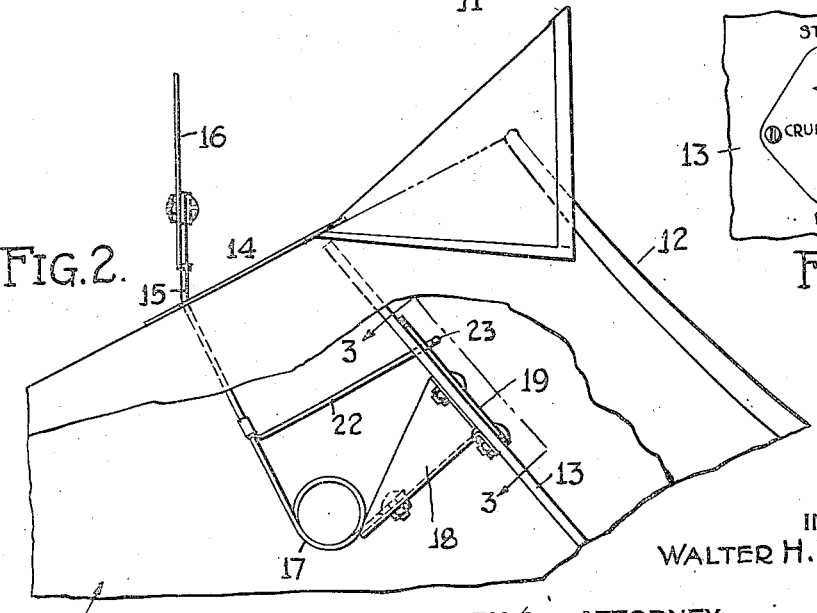
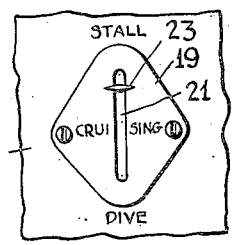
INVENTOR
WALTER H. BEECH.
BY his ATTORNEY Patented May 8, 1934

1,958,229

UNITED STATES PATENT OFFICE 1,958,229

SAFETY METER

Walter H. Beech, Wichita, Kans., assignor to Curtiss-Wright Airplane Company, a corporation of Delaware Application March 26, 1931, Serial No. 525,493

2 Claims. (Cl. 265—23)

This invention relates to an air speed meter for airplanes and especially to the type which in its simplest form constitutes a flat plate exposed to the relative air stream and adapted to be moved relatively backward distances corresponding to the force of said air stream.

Prior to my invention such devices have been designed, but never so far as I am aware has such a device been provided so positioned and arranged that it is possible to read the results thereof directly on the instrument board of the airplane. Moreover, never, so far as I am aware, has an air speed meter been arranged to indicate the stall, the cruising speed and the diving speed of the airplane.

One of the objects of my invention is to provide a practical air speed meter of simple and economical design.

A further object of the invention is to provide such an air speed meter so arranged that the indicator therefor is positioned on the instrument board of the airplane.

A further object of the invention is to provide an air speed meter capable of advising the pilot when he is flying at the proper cruising speed, and of warning him when the speed becomes so slow as to approach a stall and when the speed becomes so fast as to become excessive as in a dive.

Further objects of the invention will be apparent from a reading of the subjoined specification and claims and from a consideration of the accompanying drawing.

In order to explain the invention more clearly, one embodiment thereof is shown in said drawing, in which:

Fig. 1 is a view in perspective of a part of an airplane equipped with my improved air speed meter, parts which would normally be hidden being shown in dotted lines in order to show more clearly the device;

Fig. 2 is a view in side elevation of part of the device shown in Fig. 1, part of the covering of the fuselage being broken away in order to show the device more clearly; and Fig. 3 is a view in front elevation of the air speed indicator as it appears upon the instrument board of the airplane.

Referring specifically to the drawing, I have shown a fuselage 11 for an airplane. The fuselage has a cockpit 12 provided with an instrument board 13. Forward of said cockpit the upper part of the fuselage is provided with a longitudinally extending slot 14 through which a support rod 15 is adapted to extend. The upper end of this support rod 15 is provided with a flat plate 16 which is positioned directly in the air stream ahead of the airplane. Inasmuch as the airplane illustrated is of the pusher type, this air stream is undisturbed by the action of the airplane and thus its movement relative to the airplane corresponds to the air speed of the airplane. The rod 15 extends downward through the slot 14 into the fuselage 11 and at its lower end is secured to a coil spring 17 which has its opposite end secured to a bracket 18 fastened to the forward side of the instrument board 13. The instrument board 13 is provided with a plate 19 having a substantially vertical slot 21. A rod 22 is secured to the junction of the rod 15 and the spring 17 and extends backward through the slot 21 where it is provided with a pointer 23. If desired the rod 15 and the rod 22 or the rod 15 and the spring 17 may be integral. It may be seen that movement of the plate 16 relative to the airplane causes the spring 17 to be put under increased tension when the plate moves rearward and to be unwound when the plate moves forward, and said movement also causes movement of the rod 22 and movement of the pointer 23 over the face of the plate 19. The upper end of the plate 19 is marked to indicate a stall and the lower end of the plate is marked to indicate a dive, whereas the intermediate portion thereof is marked to indicate cruising speed. Inasmuch as the pressure upon the plate 16 corresponds to the air speed of the airplane and inasmuch as the spring 17 will be put under tension dependent upon the air pressure acting upon the plate 16, it may be seen that the movement of the rod 15 and the rod 22 will correspond to the speed of the airplane. Thus, when the plate 16 is in its extreme forward position there will be at most only a slight pressure exerted upon the plate and consequently the air speed of the airplane will be slow and approaching the stall, at the stall or below the stall. In such a condition, the pointer 23 will be at the upper part of the slot 21 and will indicate to the pilot the danger of the airplane stalling. On the other hand, as the speed of the airplane increases the pressure on the plate will increase and consequently wind the spring 17 and move the pointer 23 downward along the slot. The tension of the spring is so arranged that when the pointer reaches approximately the middle portion of the slot 21 the airplane will be flying at its normal cruising speed, but when the pointer reaches the bottom part of the slot 21 the airplane will be flying at an excessive speed such as should normally occur only in a dive, and the operator will be warned that he is in a dive.

It is to be understood that the above described embodiment of the invention is for the purpose of illustration only, and various changes may be made therein without departing from the spirit and scope of the invention.

I claim as my invention:

1. In aircraft, in combination, a fuselage, an instrument panel therewithin, said panel having a slot and having graduations adjacent said slot, and an air speed indicator including a bracket attached to said panel, a spring fixed at one end to said bracket and carrying a movable support at its other end, said spring serving as the sole means for carrying said support, a vane fixed to and movable with the outer end of said support and adapted to be moved by the impingement of air thereon, said vane lying outside of said fuselage, and an indicating arm carried by said support, adapted to project through said slot and to register against said graduations, the movement of said arm being positively effected by movement of said vane and said support.

2. In aircraft, in combination, a fuselage, an air speed meter comprising a unitary assembly including a vane adapted to project through said fuselage, a relatively strong spring, a support carrying said vane and rigidly attached to an end of said spring, and an indicating arm attached to and extending off from said support at an angle; an instrument board within said fuselage having a slot through which said arm is adapted to project; and a bracket mounted on said board adapted to rigidly hold the other end of said spring, said spring serving as the sole means for holding said support, said vane, and said indicating arm.

WALTER H. BEECH.